United States Patent
Miner (10) Patent No.: US 9,679,607 B2
(45) Date of Patent: *Jun. 13, 2017

(54) STORAGE AND EDITING OF VIDEO AND SENSOR DATA FROM ATHLETIC PERFORMANCES OF MULTIPLE INDIVIDUALS IN A VENUE

(71) Applicant: Fleye, Inc., Brentwood, NH (US)

(72) Inventor: Cameron Miner, Brentwood, NH (US)

(73) Assignee: Fleye, Inc., Brentwood, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,751

(22) Filed: Jan. 4, 2016

(65) Prior Publication Data

US 2016/0260459 A1  Sep. 8, 2016

Related U.S. Application Data

(63) Continuation of application No. 14/160,677, filed on Jan. 22, 2014, now Pat. No. 9,230,599.

(Continued)

(51) Int. Cl.
*H04N 5/77* (2006.01)
*G11B 27/031* (2006.01)
(Continued)

(52) U.S. Cl.
CPC ............ *G11B 27/031* (2013.01); *G06F 17/30* (2013.01); *G11B 27/10* (2013.01); *G11B 27/32* (2013.01);
(Continued)

(58) Field of Classification Search
None
See application file for complete search history.

(56) References Cited

U.S. PATENT DOCUMENTS 5,576,838 A  11/1996  Renie
5,655,053 A   8/1997  Renie
(Continued)

FOREIGN PATENT DOCUMENTS

CN  105051702 A  11/2015
EP  1 578 130 A1   9/2005
(Continued)

OTHER PUBLICATIONS

Heinemann et al., "iClouds-Peer-to-Peer Information Sharing in Mobile Environments," Euro-Par 2003 Parallel Processing, Lecture Notes in Computer Science, vol. 2790, pp. 1038-1045, 2003.

(Continued)

*Primary Examiner* — Eileen Adams (57) ABSTRACT

Video and sensor data from multiple locations in a venue, in which multiple individuals are engaged in athletic performances, is stored and edited to create individualized video programs of athletic performances of individuals. Each camera provides a video feed that is continuously stored. Each video feed is stored in a sequence of data files in computer storage, which data files are created in regular time intervals. Each file is accessible using an identifier of the camera and a time interval. Similarly, data from sensors is continuously received and stored in a database. The database stores, for each sensor, an identifier of each individual detected in the proximity of the sensor and the time at which the individual was detected. Each sensor is associated with one or more cameras.

6 Claims, 7 Drawing Sheets

Related U.S. Application Data (60) Provisional application No. 61/755,941, filed on Jan. 23, 2013.

(51) Int. Cl.

| | | |
|---|---|---|
| *G11B 27/10* | (2006.01) | |
| *G06F 17/30* | (2006.01) | |
| *G11B 27/32* | (2006.01) | |
| *H04N 5/91* | (2006.01) | |
| *H04N 21/2743* | (2011.01) | |
| *H04N 21/845* | (2011.01) | |
| *H04N 5/765* | (2006.01) | |
| *H04N 9/82* | (2006.01) | |

(52) U.S. Cl.
CPC ............... *H04N 5/77* (2013.01); *H04N 5/91* (2013.01); *H04N 21/2743* (2013.01); *H04N 21/8456* (2013.01); *H04N 5/765* (2013.01); *H04N 9/8205* (2013.01)

(56) References Cited

U.S. PATENT DOCUMENTS

| | | |
|---|---|---|
| 5,694,514 A | 12/1997 | Evans et al. |
| 5,751,885 A | 5/1998 | O'Loughlin et al. |
| 6,449,010 B1 | 9/2002 | Tucker |
| 6,466,259 B1 | 10/2002 | Stanton |
| 6,526,158 B1 | 2/2003 | Goldberg |
| 6,650,360 B1 | 11/2003 | Osen |
| 6,778,171 B1 | 8/2004 | Kikinis |
| 6,813,586 B1 | 11/2004 | Vock et al. |
| 6,824,317 B2 | 11/2004 | Finizio et al. |
| 6,990,681 B2 | 1/2006 | Wang et al. |
| 7,046,273 B2 | 5/2006 | Suzuki |
| 7,054,784 B2 | 5/2006 | Flentov et al. |
| 7,327,383 B2 | 2/2008 | Valleriano et al. |
| 7,512,515 B2 | 3/2009 | Vock et al. |
| 7,603,255 B2 | 10/2009 | Case, Jr. et al. |
| 7,623,987 B2 | 11/2009 | Vock et al. |
| 8,051,452 B2 | 11/2011 | Arseneau et al. |
| 8,077,981 B2 | 12/2011 | Elangovan et al. |
| 8,451,333 B2 | 5/2013 | Sandler et al. |
| 8,711,224 B2 | 4/2014 | Sandler et al. |
| 8,856,553 B2 | 10/2014 | Lyakhovitskiy et al. |
| 9,108,098 B2 | 8/2015 | Galasso et al. |
| 9,230,599 B2 * | 1/2016 | Miner ............... H04N 5/77 |
| 2003/0030658 A1 | 2/2003 | Gibbs et al. |
| 2003/0049591 A1 | 3/2003 | Fechter et al. |
| 2003/0058344 A1 | 3/2003 | Mino |
| 2003/0179294 A1 | 9/2003 | Martins |
| 2004/0100566 A1 | 5/2004 | Valleriano et al. |
| 2004/0201738 A1 | 10/2004 | Moores, Jr. et al. |
| 2005/0093976 A1 | 5/2005 | Valleriano et al. |
| 2005/0202905 A1 | 9/2005 | Chesser |
| 2006/0078047 A1 | 4/2006 | Shu et al. |
| 2006/0095340 A1 | 5/2006 | Iadanza et al. |
| 2007/0039030 A1 | 2/2007 | Romanowich et al. |
| 2007/0052803 A1 | 3/2007 | Chosak et al. |
| 2007/0058041 A1 | 3/2007 | Arseneau et al. |
| 2007/0091178 A1 | 4/2007 | Cotter et al. |
| 2007/0279494 A1 | 12/2007 | Aman et al. |
| 2008/0198230 A1 | 8/2008 | Huston |
| 2008/0251575 A1 | 10/2008 | Bowling et al. |
| 2008/0303901 A1 | 12/2008 | Variyath et al. |
| 2009/0040301 A1 | 2/2009 | Sandler et al. |
| 2009/0041298 A1* | 2/2009 | Sandler ............... G11B 27/034 382/103 |
| 2009/0150114 A1 | 6/2009 | Vock et al. |
| 2009/0153654 A1 | 6/2009 | Enge et al. |
| 2009/0262194 A1 | 10/2009 | Wakefield et al. |
| 2010/0026809 A1 | 2/2010 | Curry |
| 2010/0182436 A1 | 7/2010 | Boman et al. |
| 2011/0071792 A1* | 3/2011 | Miner ............... G06K 9/00771 702/182 |
| 2011/0090344 A1 | 4/2011 | Gefen et al. |
| 2011/0228098 A1 | 9/2011 | Lamb et al. |
| 2012/0162436 A1 | 6/2012 | Cordell et al. |
| 2012/0308209 A1 | 12/2012 | Zaletel |
| 2013/0100268 A1* | 4/2013 | Mihailidis ............... G08B 21/02 348/77 |
| 2013/0182117 A1 | 7/2013 | Arseneau et al. |
| 2013/0286212 A1 | 10/2013 | Sandler et al. |
| 2013/0297368 A1 | 11/2013 | Meyer et al. |
| 2014/0105577 A1 | 4/2014 | Wang |
| 2014/0219628 A1 | 8/2014 | Miner |
| 2015/0294514 A1 | 10/2015 | McCollum et al. |
| 2016/0071541 A1 | 3/2016 | Miner |

FOREIGN PATENT DOCUMENTS

| | | |
|---|---|---|
| EP | 2 948 850 A1 | 12/2015 |
| WO | 2005/025234 A1 | 3/2005 |
| WO | 2011/001180 A1 | 1/2011 |
| WO | 2012/027626 A2 | 3/2012 |
| WO | 2014/116689 A1 | 7/2014 |
| WO | 2016/040475 A1 | 3/2016 |

OTHER PUBLICATIONS

Kosmopoulos, et al., "Vision-Based Production of Personalized Video" Signal Processing: Image Communication, vol. 24, Issue 3, Dec. 17, 2008, 39 Pages.

Underwood, S., "Making sense of real-time behavior," Communications of the ACM, vol. 53, Issue 8, Aug. 2010, pp. 17-18.

International Search Report received for PCT Application No. PCT/US11/49252, mailed on Mar. 23, 2012, 5 Pages.

Non-Final Office Action mailed on Jun. 8, 2012 in related U.S. Appl. No. 12/869,096, filed Aug. 26, 2010, 11 Pages.

International Preliminary Report on Patentability and Written Opinion received for PCT Application No. PCT/US2011/049252 mailed on Mar. 7, 2013, 12 Pages.

Final Office Action mailed on Jun. 7, 2013 in related U.S. Appl. No. 12/869,096, filed Aug. 26, 2010, 15 Pages.

International Search Report and Written Opinion received for PCT Application No. PCT/US2014/012528, mailed on May 13, 2014, 12 Pages.

Final Office Action mailed Oct. 2, 2014 in related U.S. Appl. No. 12/869,096, filed Aug. 26, 2010, 16 Pages.

Non-Final Office Action mailed on Feb. 13, 2015 in related U.S. Appl. No. 14/160,677, filed Jan. 22, 2014, 18 Pages.

International Preliminary Report on Patentability and Written Opinion received for PCT Application No. PCT/US2014/012528 mailed Jul. 28, 2015, 4 Pages.

Notice of Allowance received on Sep. 23, 2015, in related U.S. Appl. No. 14/160,677, filed Jan. 22, 2014, 9 Pages.

International Preliminary Report on Patentability and Written Opinion received for PCT Application No. PCT/US2015/049177 mailed Jan. 4, 2016, 6 Pages.

Non-Final Office Action mailed Feb. 12, 2016 in related U.S. Appl. No. 12/869,096, filed Aug. 26, 2010, 36 Pages.

Non-Final Office Action mailed on Sep. 8, 2016, in related U.S. Appl. No. 14/849,089, filed Sep. 39, 2015, 10 Pages.

Extended European Search Report received for EP Application No. 14743265.2, mailed on Sep. 15, 2016, 8 pages.

Final Office Action mailed on Nov. 17, 2016 in related U.S. Appl. No. 12/869,096, filed Aug. 26, 2010, 23 Pages.

Office Action received for CN Application No. 201480017578.6, mailed on Dec. 5, 2016, 3 Pages.

* cited by examiner

STORAGE AND EDITING OF VIDEO AND SENSOR DATA FROM ATHLETIC PERFORMANCES OF MULTIPLE INDIVIDUALS IN A VENUE

CROSS-REFERENCE TO RELATED APPLICATIONS

This application is a continuation of U.S. patent application Ser. No. 14/160,677, filed Jan. 22, 2014, which is a nonprovisional application of provisional patent application 61/755,941, filed Jan. 23, 2013, which are hereby incorporated by reference.

BACKGROUND

There is an increasing demand among individuals who participate in a variety of athletic and other activities to have access to video and other data about their performance. This demand is especially increasing for activities in large venues with large numbers of people, such as skiing, snowboarding, bicycling, running and the like. Creating edited videos of individuals participating in such activities can be time consuming. It can be difficult to efficiently capture and store video data for such activities, and then compile edited video programs for each of multiple individuals in such activities, especially given multiple video feeds, data feeds and participants.

SUMMARY

This Summary is provided to introduce a selection of concepts in a simplified form that are further described below in the Detailed Description. This Summary is intended neither to identify key or essential features of the claimed subject matter, nor to limit the scope of the claimed subject matter.

Video data and sensor data from multiple locations in a venue, in which multiple individuals are engaged in athletic performances, is stored and edited to create individualized video programs of athletic performance of selected individuals. Each camera provides a video feed that is continuously stored, for which recording can be started at the beginning of an event or triggered by proximity or motion detection. Each video feed is stored in a sequence of data files in computer storage, which data files are created in regular time intervals. Each file is accessible using an identifier of the camera from which the video feed is received, and a time interval representing the time period from the camera from which the file stored the video data. Similarly, data from sensors is continuously received and stored in a database. The database stores, for each sensor, an identifier of each individual detected in the proximity of the sensor and the time at which the individual was detected. Each sensor is associated with one or more cameras. To generate a video program for an individual, given the identifier of the individual, the sensor data is accessed to identify when the individual was in the proximity of any of the sensors. This data can be in the form of a sensor identifier and time stamp. The sensor identifier is mapped to one or more cameras. The corresponding cameras are used to identify data files for that camera. The time stamps are used to specify an interval of time, which in turn identifies one or more of the data files for the camera. Given the identified video files, the time stamps from the sensor data can in turn be used to select a clip (a time interval of the video data in the file) from each video file. The time interval can be defined by in points and out points, using an amount of time preceding and following a given time stamp from the sensor data. The clips can then be placed in sequence in order according to the time stamp to provide an initial sequence of clips for the video program of the individual's performance.

The video data can be stored in both a high resolution and a low resolution. Either resolution can be selected for output of the edited video program. Alternatively, the video data can be stored in only a high resolution and low resolution versions can be generated dynamically on demand. The high resolution files also can be used to generate still images and/or composite images on demand. The low resolution images are better suited to, for example, streaming over a network.

In the following description, reference is made to the accompanying drawings which form a part hereof, and in which are shown, by way of illustration, specific example implementations. Other implementations may be made without departing from the scope of the disclosure.

DETAILED DESCRIPTION

The following section provides an example operating environment in which this video system can be implemented.

This system allows for playing video on the web and selecting full resolution clips and still images from the video streams. The methods are efficient and scalable to thousands of users, and higher resolutions. The technology can be applied to the original source video file or to a "proxy" video file which has been reduced in resolution and/or higher compression.

The system is particularly useful for application where there is a need to have large amounts of video accessed by a large number of people. One example of this is for a race, where there may be tens of thousands of people accessing video from dozens of cameras that were capturing the event throughout the day. Each person only wants to see his or her own video clips, and may want to be able to adjust the duration of the video clip. This system allows them to view their own video clip, adjust them, and share them with others in an efficient manner. Additionally, this system allows them to select a clip (which may be as short as a single frame) to download at full resolution.

Video and images are captured at a venue on a number of cameras. Each video clip or still images is tagged with a time stamp and a location. For each user of the system, timestamped location information is logged (via RFID, GPS, or any other means of identifying individuals at a specific location) and this information if used to create a list of "virtual clips" for the user. These "virtual clips" reference a lower-resolution proxy video for playback on the website. The in and out points of a clip can be calculated from a time stamp from the sensor data, and a variable amount of time preceding the time stamp, and a variable amount of time following the time stamp. These variable amounts can be different for preceding and following values, and can be different for each camera. The user can adjust the "in" and "out" points for the virtual clip, allow them to change the duration of the clip. This same information can also be used to select and download the full resolution video files. If the virtual clip's in and out points are brought together to include just a single frame, the full resolution frame can be considered a "still image" or "photo" and it can be downloaded or used to make a print (e.g. 3×5, 4×6, 8×10, wall size, etc.).

Figure 1:
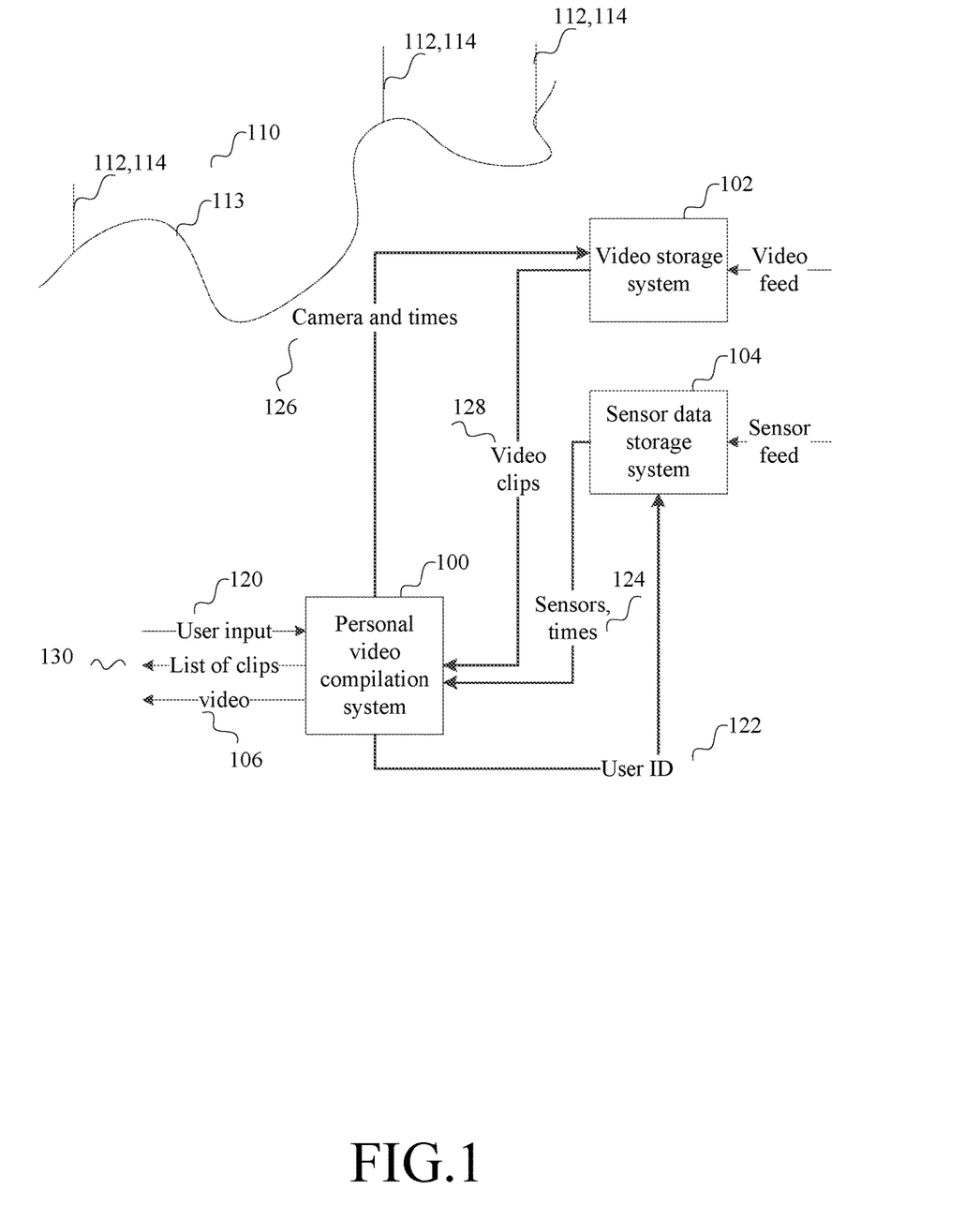
FIG. 1 is a block diagram of a system that captures video and sensor data from multiple cameras and sensors in a venue.

Thus, referring to FIG. 1, a personal video compilation system 100 accesses a video storage system 102 and a sensor data storage system 104 to allow a user to access a compiled video program 106 of an individual's performance. Environments in which such systems can be used are described in detail in U.S. Patent Publication 20110071792 (the "Related Publication"). In general, a venue 110 is provided in which multiple individuals are participating in an athletic activity, such as a foot race, a bicycle race, a triathlon, downhill skiing, snowboarding, cross-country skiing and the like, which may take place along a path 113 or a loop, or within a space. Within the venue, multiple cameras 112 and associated sensors 114 are provided. A sensor may have access to any time code available from its associated camera.

The cameras 112 provide a continuous video feed. The sensors 114 provide a continuous data feed, but providing useful data when an individual is detected in the proximity of the sensor. Any sensor technology can be used so long as the sensor can provide an indication of an individual that is in its proximity at a given point in time. For example, the sensor can detect the presence of an RFID tag for an individual using an RFID detector, and then receive time stamp data from a timer on its associated camera. A variety of other sensors can be used as described in the Related Publication.

The video storage system 102 receives video feeds including video data from the multiple cameras and stores the video data into data files on computer storage. In general, the video storage system is implemented using a server computer that receives and stores video data from multiple remote cameras through an interface (not shown).

The sensor data storage system 104 receives sensor data feeds including sensor data from the multiple sensors and stores the sensor data into a database. In general, the sensor data storage system is implemented using a server computer that receives and stores sensor data from multiple remote sensors through an interface (not shown).

During an event, the video storage system and the sensor data storage system continuously record video data and sensor data from the cameras and sensors in the venue. At any point after data is recorded, the personal video compilation system can access the recorded video and sensor data to retrieve video data for an individual.

In particular, in response to user input 120, the personal video compilation system uses an identifier 122 of an individual to access the sensor data storage system. From the sensor data storage system, the compilation system receives the sensors and times 124 indicating when the selected individual was in the proximity of the identified sensors. The sensors are mapped to camera identifiers, and the camera identifiers and time stamps 126 are used to access the video data files stored in the video storage system. Video clips 128 (such as a file name and a time span with that file name) can be returned by the video storage system. The compilation system 100 then can provide a list of clips 130, compiled video 106 or other output based on the retrieved video clips 128.

Given this context, an example implementation of this system will be described in more detail in connection with FIGS. 2-5.

Figure 2:
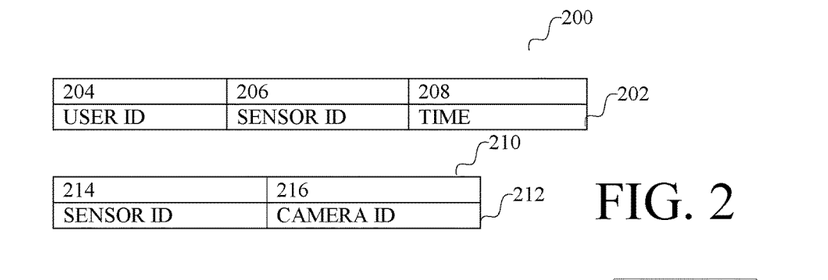
FIG. 2 is an illustration of an example database that can be used in an example implementation of the system of FIG. 1.

In FIG. 2, an example implementation of a database for the sensor data now will be described. Each sensor provides a data pair including an identifier of an individual and a time at which the individual was in the proximity of the sensor. This data can be stored in a database such as shown in FIG. 2. A database table 200 can include a row 202 for each sensor event. The database table can be provided for each sensor, or the sensor identifier can be included as a column (e.g., 206) in the database table. Each row 202 has the individual identifier 204 and the time 208 at which the individual was in the proximity of the sensor. Another table 210 includes rows 212 that relate sensor identifiers 214 to camera identifiers 216. Other mechanisms can be used to track the relationship between sensors and cameras, including not using a database or other explicit record and relying on naming conventions.

Time and date stamps also can be used. Instead of running a camera continuously for an event, recording during the event can be triggered using outputs from the sensor associated with a camera. A list of time stamped data files by camera also can be stored, with the time and data stamps and camera identifier for the corresponding video being used as part of the file names.

As another example implementation, a database can include a row for each individual identifier, and a column for each sensor, for storing the time at which the individual was in the proximity of the sensor. The database can be implemented in many ways, including but not limited to a spread sheet data file or a relational database.

Figure 3:
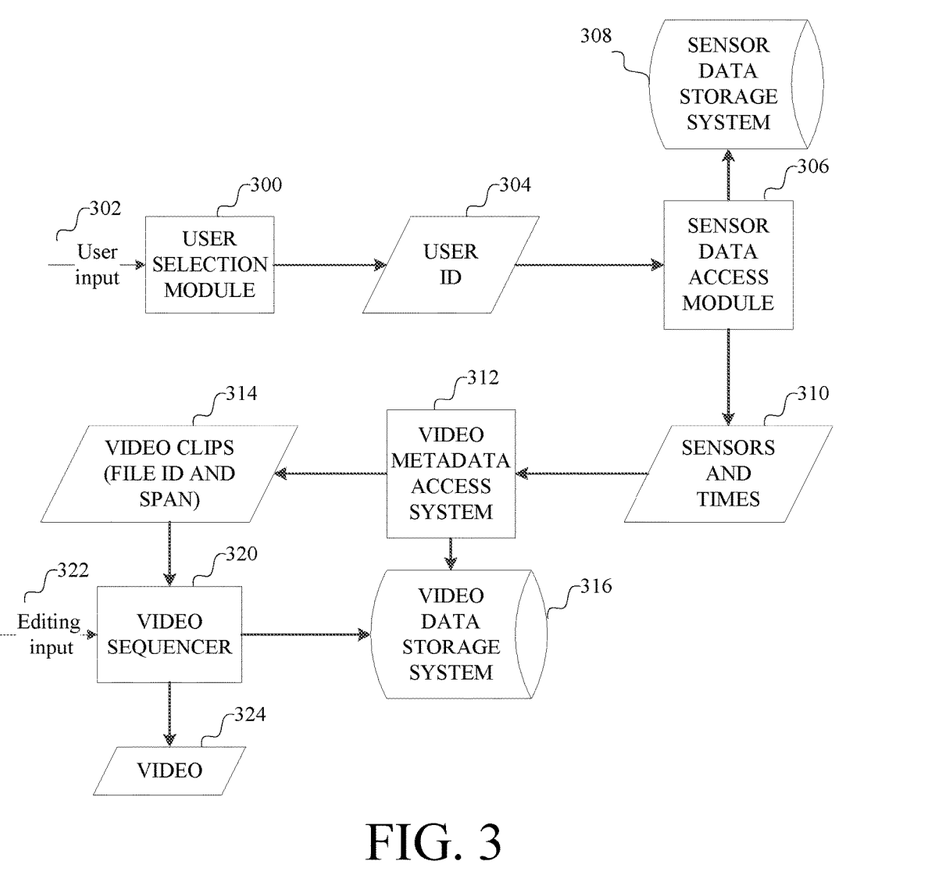
FIG. 3 is a data flow diagram illustrating an example implementation of the system of claim 1.

A more detailed data flow diagram of the system will now be described in connection with FIG. 3. A user selection module 300 receives user input 302 indicative of an individual to be selected. The identifier 304 of this individual is provided to a sensor data access module 306, which access the sensor data storage system 308. From the sensor data storage system, the sensor identifiers and times of proximity 310 are output. These identifiers and time are used by the video access module 312 to access data 314 about the various video files that are available in the video data storage system 316. The data 314 includes video clip identifiers and spans within those files. This information is provided to a video sequencer 320 for editing. The video sequencer 320 can be implemented using any kind of video editing system that can edit a video program using spans of video data within data files. The video sequencer 320 edits video according to editing inputs 322 and provides video output 324. The editing inputs depend on the nature of the video editing system. The video output can be in any format, including files or streaming output or a display. The video sequencer 320 also may use the sensor data for sorting and providing an initial sequence of the video clips.

Figure 4:
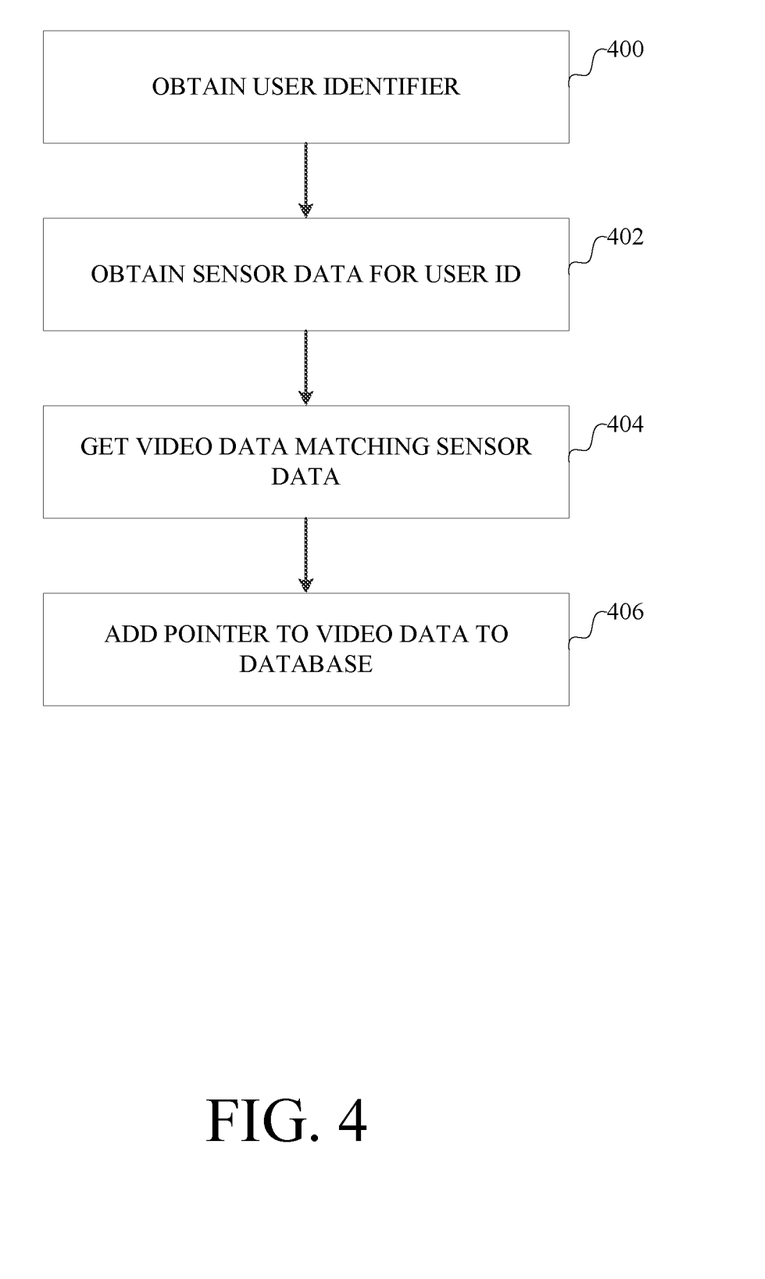
FIG. 4 is a flow chart describing an example operation of the system in FIG. 2.

Referring now to FIG. 4, a flowchart of an example implementation of this system will now be described. The system obtains 400 an identifier of a user. Sensor data corresponding to the user identifier is then retrieved 402. Video clips matching the sensor data can then be identified 404. Pointers or other references to the identified video clips then can be stored 406, such as in a database. Thus for each user, sensor data and references to video clips can be stored and retrieved for each user. Subsequently, the clips then can be combined in time order, for example according to time stamps from the sensor data.

Figure 5:
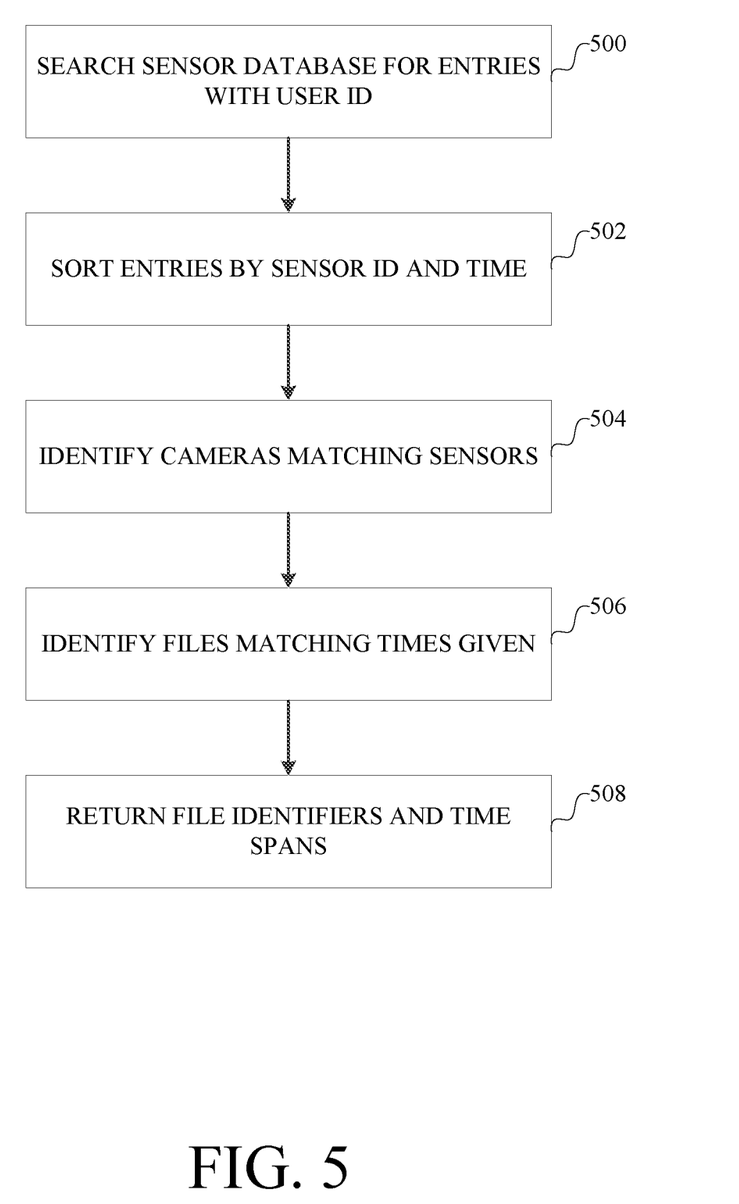
FIG. 5 is a flow chart describing an example operation of the system in FIG. 2

Addressing more detail of this operation, we refer now to FIG. 5. Given a user identifier, the sensor data storage is searched 500 for entries matching the user identifier. These entries can be sorted 502 by sensor identifier and time. The cameras associated with each sensor identifier are then identified 504. The files for each camera for the given times are then identified 506. The file identifier and a span within the file are then returned 508.

A variety of other operations can be provided to an individual when the video file segments for that individual are identified. The individual can be allowed to edit the video, download a version of the edited video or selected video clips, generate and download a still image from the video clips, and share such information with others. Various video editing tools for trimming clips (i.e., changing the in and/or out points of clips), reordering clips in a sequence, adding filters, transitions, video effects, music, other audio and the like, also can be provided.

In some environments, cameras and/or sensors can be mobile. In the case where cameras are mobile, and sensors are stationary, location information available from a camera, and/or detection of proximity of the camera by a sensor, can be used to associate the camera with a sensor for a given period of time. In the case where both cameras and sensors are mobile, location information for the cameras and sensors, and/or detection of proximity of cameras to sensors, can be used to associate the camera with a sensor for a given period of time. Given the association of cameras and sensors for a periods of time, and events from sensors that have time and dates, a sequence of events from sensors over time can be automatically converted into a corresponding sequence of video clips over time.

Figure 7:
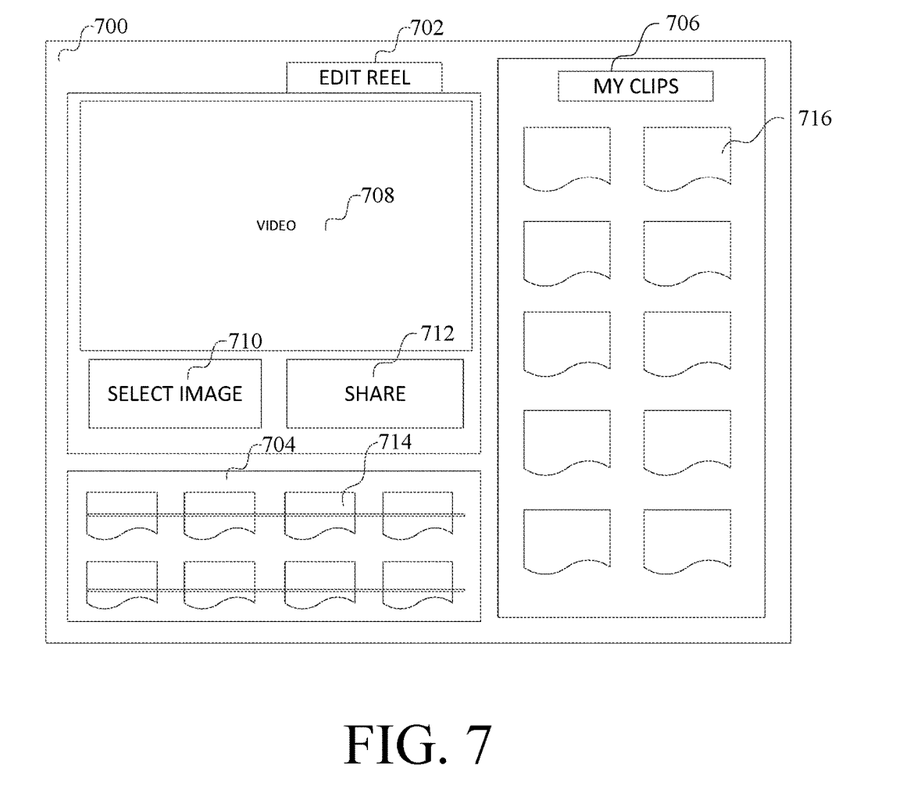
FIG. 7 is an example graphical user interface for editing a video from an event.
Figure 8:
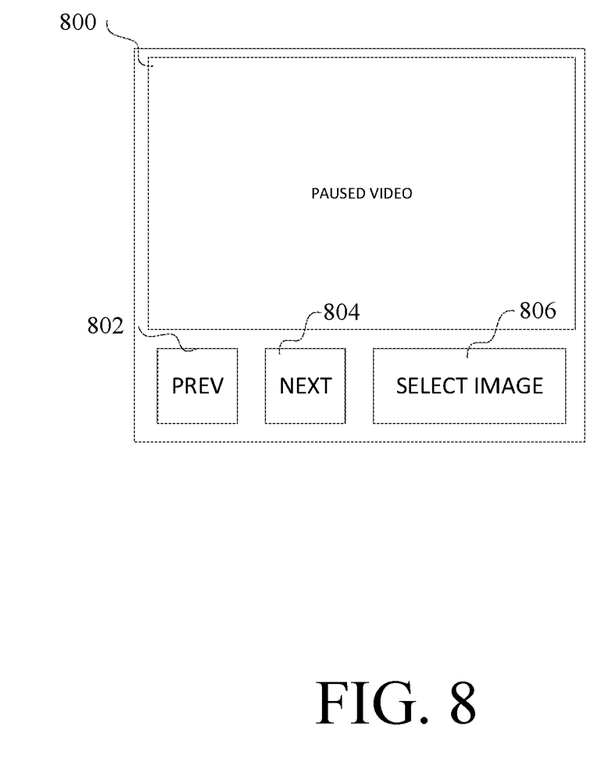
FIG. 8 is an example graphical user interface for selecting a still image.

Referring now to FIGS. 7 and 8, an example implementation of a graphical user interface for editing the video will now be described. Such an interface can be provided by, for example, an application on a computing device or in a web browser running on a computing device. The interface includes, in a display area 700, a viewing area 702, a sequencing area 704 and a clip collection area 706, defined as nonoverlapping panes within the display area 700. Other arrangements of such areas also can be provided.

Within the viewing area 702, video is displayed in a video area 708. Various video playback controls (not shown) can be provided in this viewing area, as is conventional, such as play, stop, pause, fast forward, rewind, play in a loop, back to start, a position bar, and so on. The video displayed in the video area 708 is based on the sequence of video clips currently defined for this user.

Two user input buttons also are provided in the viewing area 702. One button 710 allows a user to select the currently viewed picture as a still image to be extracted for the user. In response to a user selecting button 710, another user interface can be displayed to allow the user to set and/or select various parameters for the still image to be created.

Referring to FIG. 8, an example still image selection interface is shown. In this interface, a video area 800 displays a currently selected image from the paused video. Control buttons, e.g., a previous button 802 and a next button 804, are provided. Various other control buttons can be provided to allow for different kinds of navigation. When a user manipulates the previous button 802, the system backs up the video one frame. When a user manipulated the next button 804, the system advances the video one frame. When a user is satisfied with the image, the user can manipulate a select image button 806 which selects that image for distribution to the user.

Another button 712 in the viewing area 702 allows a user to share the edited video. In response to a user selecting button 712, another user interface can be displayed to allow the user to set and/or select various parameters regarding how the video will be shared.

In the sequencing area 704, the system displays indications of each video clip 714 in the edited video program. An example representation of a sequence of video clips is illustrated in FIG. 7, but the invention is not limited thereto. Various editing operations, conventional for editing video, and visual representations of an edited sequence of clips, can be provided. Such editing operations can include adding, deleting, modifying the duration of (i.e., trimming), and reordering the video clips.

Similarly, in the clip collection area 706, the system displays indications 716 of each video clip containing images of the current user or a selected user. Clips can be selected and added from the clip collection area 706 into the edited sequence shown in 704.

The initial representation of the sequence in the sequencing area 704 is generated by time-ordering the clips retrieved from video storage relating to the current user, based on a user login or based on a selected user. Similarly, the collection of clips in the clip collection area 706 also is provided by selecting clips retrieved from video storage relating to the current user, based on a user login or based on a selected user. In the clip collection area 704, various sorting and searching tools can be provided to allow a user to search for and identify clips based on various attributes of the clip metadata or video data.

Figure 6:
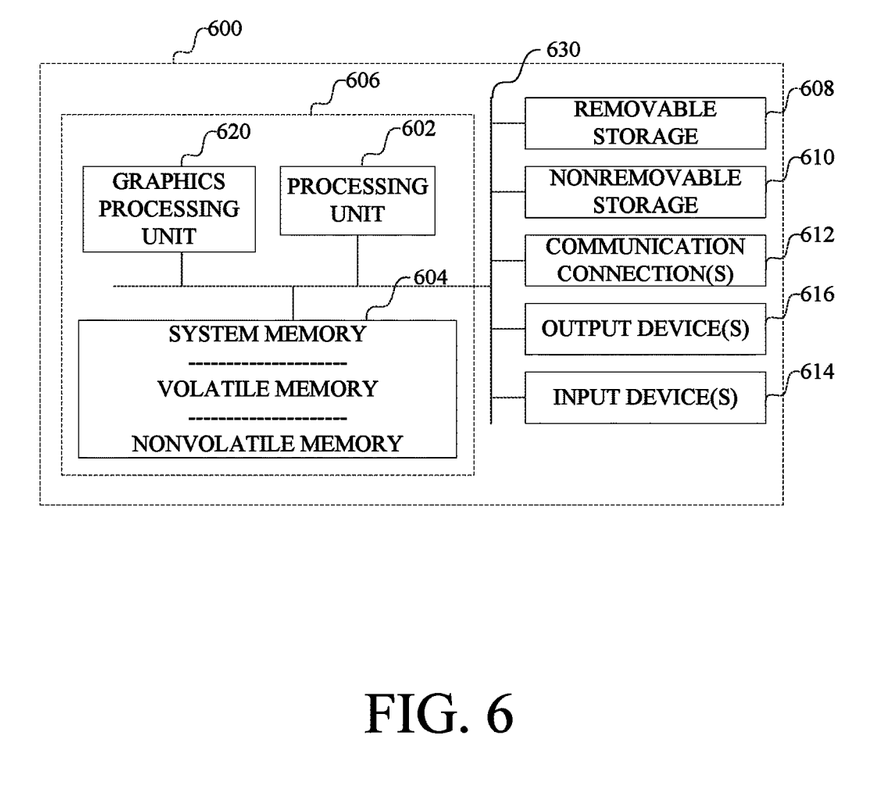
FIG. 6 is a block diagram of an example computing device in which such a system can be implemented.

Having now described an example implementation, FIG. 6 illustrates an example computer with which such techniques can be implemented. The following description is intended to provide a brief, general description of such a computer. The computer can be any of a variety of general purpose or special purpose computing hardware configurations. Examples of computers that can be used include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above types of computers or devices, and the like.

FIG. 6 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 6, an example computer in a basic configuration includes at least one processing unit 602 and memory 604. The computer can have multiple processing units 602. A processing unit 602 can include one or more processing cores (not shown) that operate independently of each other. Additional co-processing units, such as graphics processing unit 620, also can be present in the computer. The memory 604 may be volatile (such as RAM), non-volatile (such as ROM, flash memory, etc.) or some combination of the two. This basic configuration is illustrated in FIG. 6 by dashed line 606. The computer 600 may include additional storage (removable and/or non-removable) including, but not limited to, magnetic or optical disks or tape. Such additional storage is illustrated in FIG. 6 by removable storage 608 and non-removable storage 610.

A computer storage medium is any medium in which data can be stored in and retrieved from addressable physical storage locations by the computer. Computer storage media includes volatile and nonvolatile, removable and non-removable media. Memory 604, removable storage 608 and non-removable storage 610 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 600 also may include communications connection(s) 612 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 612 are devices, such as a network interface or radio transmitter, that interface with the communication media to transmit data over and receive data from communication media.

Computing machine 600 may have various input device(s) 614 such as a keyboard, mouse, pen, camera, touch input device, and so on. Output device(s) 616 such as a display, speakers, a printer, and so on may also be included. All of these devices are well known in the art and need not be discussed at length here.

The various components in FIG. 6 are generally interconnected by an interconnection mechanism, such as one or more buses 630.

Each component of such the system described herein that operates on a computer generally is implemented using one or more computer programs processed by one or more processing units in the computer. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the computer to include various devices or data structures. This computer system may be practiced in distributed computing environments where tasks are performed by remote computers that are linked through a communications network. In a distributed computing environment, computer programs may be located in both local and remote computer storage media.

It should be understood that the subject matter defined in the appended claims is not necessarily limited to the specific implementations described above. The specific implementations described above are disclosed as examples only.

What is claimed is:

1. A computer system for generating an edited video program for an individual from a set of individuals participating in an event in a venue, wherein the venue includes a plurality of cameras that capture video of the individuals and a plurality of sensors, each sensor associated with one or more cameras of the plurality of cameras, each of the sensors at least detecting proximity of an individual near the sensor, the computer system comprising:

a processing unit, a computer storage medium and a database, and interfaces connected to receive data from the plurality of sensors and to receive video data from the plurality of cameras;

the processing unit executing computer program instructions to be operative to:

continuously receive the video data from the plurality of cameras during periods of time during the event;

store the received video data for each camera in a sequence of data files in the computer storage, each data file in the sequence being created in regular time intervals, each data file having as associated time interval and including video data from the camera for a period of time during the event in the associated time interval, each data file in the sequence being accessible using an identifier of the camera providing the received video data and data representing the time interval;

continuously receive the data from the plurality of sensors during periods of time during the event, the received data, from each sensor, being indicative of individuals and times at which proximity of the individuals to the sensor is detected by the sensor;

store the received data from each sensor in the database such that the database stores, for each sensor, an identifier of each individual detected in the proximity of the sensor by the sensor, and a time at which the individual was detected in the proximity of the sensor by the sensor;

receive an indication of an individual;

access, from the database, the stored data from the sensors, using the indication of the individual, to retrieve times from the database at which the individual was detected in the proximity of one or more of the sensors by the one or more of the sensors, and identifiers of the one or more of the sensors;

access the stored video data from the computer storage to retrieve clips of the stored video data received from cameras associated with the one or more sensors, according to the retrieved times from the database at which the individual was detected in the proximity of one or more sensors by the one or more of the sensors.

2. A computer system for generating an edited video program for an individual using video captured from a plurality of cameras and sensor data captured from a plurality of sensors, the computer system comprising:

a processing unit, a computer storage medium and a database, and interfaces connected to receive data from the plurality of sensors and to receive video data from the plurality of cameras;

the processing unit executing computer program instructions to be operative to:

receive and store the video data from the plurality of cameras, the received video data received from each camera being stored in a sequence of data files, each data file in the sequence being created in regular time intervals, each data file having as associated time interval and including video data from the camera for a period of time in the associated time interval, each data file in the sequence being accessible using an identifier of the camera providing the received video data and data representing the time interval;

receive and store the sensor data from the plurality of sensors during periods of time, the received data, from each sensor, being stored in a database and being indicative of times at which proximity of the individual to the sensor is detected, such that the database stores, for each sensor, an identifier of each individual detected in the proximity of the sensor by the sensor, and a time at which the individual was detected in the proximity of the sensor by the sensor;

access, from the database, the stored sensor data, using an indication of the individual, to retrieve times from the database, at which the individual was detected in the proximity of one or more of the sensors by the one or more of the sensors, and identifiers of the one or more of the sensors;

based on at least the identifiers of the one or more of the sensors, identify cameras associated with each of the one or more of the sensors;

access the stored video data received from the identified cameras to retrieve clips of the stored video data received from the identified cameras according to the retrieved times at which the individual was in the proximity of the one or more of the sensors associated with the identified cameras.

3. The computer system of claim 1, wherein to access the stored video data, the processing unit is operative to:
determine, for each time of the retrieved times for the individual, a time interval corresponding to the time;
determine, for each identifier of the retrieved identifiers of the one or more sensors, an identifier of the camera associated with the sensor; and
access the data file using the determined identifier of the camera and the determined time interval.

4. The computer system of claim 2, wherein to access the stored video data, the processing unit is operative to:
determine, for each time of the retrieved times for the individual, a time interval corresponding to the time;
access the data file storing video data received from the identified camera according to the determined time interval.

5. A computer system for generating a video program for an individual from a set of individuals participating in an event in a venue, wherein the venue includes a plurality of cameras, each camera being configured to capture video of the individuals, and wherein the venue further includes a plurality of sensors, each sensor associated with one or more cameras of the plurality of cameras, each sensor being configured to detect at least proximity of an individual near the sensor, the computer system comprising:
a processing unit, a computer storage medium and a database, and interfaces connected to receive data from the plurality of sensors and to receive video data from the plurality of cameras;
the processing unit executing computer program instructions to be operative to:
continuously store video data in computer storage from each camera of the plurality of cameras, during periods of time during the event, the stored video data being accessible using an identifier of the camera and data representing a time interval;
continuously receive data from the plurality of sensors during the event, the received data, from each sensor, being indicative of individuals and times at which proximity of the individuals to the sensor is detected by the sensor;
store the received data from each sensor in a database such that the database stores, for each sensor, an identifier of each individual detected in the proximity of the sensor by the sensor, and a time at which the individual was detected in the proximity of the sensor by the sensor;
identify, using a time at which an individual is detected in proximity of one or more of the sensors by the one or more of the sensors, and identifiers of the one or more of the sensors, the one or more cameras associated with the one or more of the sensors, and access the stored video data from the computer storage to retrieve clips of the stored video data from the one or more cameras, corresponding to the times at which the individual was detected in the proximity of one or more sensors by the one or more of the sensors; and
compile a sequence of the retrieved clips of the individual.

6. The computer system of claim 5, wherein to access the stored video data, the processing unit is operative to:
determine, for a time at which the individual was detected in the proximity of one or more sensors by the one or more of the sensors, a time interval corresponding to the time;
access the data file storing video data received from the identified camera according to the determined time interval.

* * * * *